(12) United States Patent
Cheng

(10) Patent No.: US 8,029,359 B2
(45) Date of Patent: Oct. 4, 2011

(54) PROVIDING OFFERS TO COMPUTER GAME PLAYERS

(75) Inventor: YuChiang Cheng, San Francisco, CA (US)

(73) Assignee: World Golf Tour, Inc., San Francisco, CA (US)

( * ) Notice: Subject to any disclaimer, the term of this patent is extended or adjusted under 35 U.S.C. 154(b) by 382 days.

(21) Appl. No.: 12/057,276

(22) Filed: Mar. 27, 2008

(65) Prior Publication Data

US 2009/0247282 A1  Oct. 1, 2009

(51) Int. Cl.
*G06F 19/00* (2006.01)
*A63B 71/06* (2006.01)

(52) U.S. Cl. .... 463/25; 463/3; 463/4; 463/6; 273/317.1; 273/461; 705/14.1; 705/14.12

(58) Field of Classification Search ............. 463/17–19, 463/3–4, 6, 25; 273/269, 108.1–108.4, 245–247, 273/317.1–317.6, 461; 283/48.1, 49–51; 705/14.1, 14.12, 14.22, 14.3, 14.38; 700/90; G06F 19/00; A63B 71/06

See application file for complete search history.

(56) References Cited

U.S. PATENT DOCUMENTS

| | | | | |
|---|---|---|---|---|
| 5,816,918 A * | 10/1998 | Kelly et al. | | 463/16 |
| 6,045,447 A * | 4/2000 | Yoshizawa et al. | | 463/31 |
| 6,112,185 A * | 8/2000 | Walker et al. | | 705/5 |
| 6,142,475 A * | 11/2000 | Hennessey | | 273/296 |
| 6,579,176 B2 * | 6/2003 | Huang et al. | | 463/9 |
| 6,632,142 B2 | 10/2003 | Keith | | |
| 6,839,680 B1 * | 1/2005 | Liu et al. | | 705/10 |
| 6,952,716 B1 * | 10/2005 | Robb et al. | | 709/205 |
| 7,054,928 B2 * | 5/2006 | Segan et al. | | 709/225 |
| 7,076,444 B1 * | 7/2006 | Baron et al. | | 705/14.26 |
| 7,076,445 B1 * | 7/2006 | Cartwright | | 705/14.12 |
| 7,335,106 B2 * | 2/2008 | Johnson | | 463/42 |
| 7,455,586 B2 * | 11/2008 | Nguyen et al. | | 463/16 |
| 7,468,729 B1 * | 12/2008 | Levinson | | 345/473 |
| 7,572,187 B2 * | 8/2009 | Van Luchene | | 463/42 |
| 7,658,674 B2 * | 2/2010 | Walker et al. | | 463/25 |
| 7,698,178 B2 * | 4/2010 | Chu | | 705/28 |
| 7,771,278 B1 * | 8/2010 | Muskin | | 463/29 |
| 7,854,653 B2 * | 12/2010 | Kane | | 463/9 |
| 7,901,288 B2 * | 3/2011 | Barsness et al. | | 463/30 |
| 2002/0046102 A1 * | 4/2002 | Dohring et al. | | 705/14 |
| 2003/0032476 A1 * | 2/2003 | Walker et al. | | 463/25 |
| 2004/0005926 A1 * | 1/2004 | LeFroy | | 463/42 |

(Continued)

OTHER PUBLICATIONS

Xbox.com, "Calendar of Events—Play & Win with Xbox.com LIVE!", [online]. Microsoft Corporation, [Retrieved on Mar. 31, 2008]. Retrieved from the Internet: <URL: http://www.xbox.com/en-US/community/events/playandwin/?WT.svl=nav>, 4 pp.

(Continued)

*Primary Examiner* — Arthur O. Hall
(74) *Attorney, Agent, or Firm* — Innovation Counsel LLP

(57) ABSTRACT

A method of rewarding a game player of a game can target particular types of offers to a player. A usage profile is determined for the player, which can be based on interaction between the player and items or goals in a game. Player information is identified, such as player statistics or categorization of the player. A category is selected for the player, based on the usage profile and the player information for the player. An offer is then selected from a group of offers, wherein the offer is for a real world object, service or event.

12 Claims, 6 Drawing Sheets

U.S. PATENT DOCUMENTS

| | | | |
|---|---|---|---|
| 2004/0043810 A1* | 3/2004 | Perlin et al. | 463/16 |
| 2005/0090314 A1* | 4/2005 | Nassef, Jr. | 463/43 |
| 2005/0222989 A1* | 10/2005 | Haveliwala et al. | 707/3 |
| 2005/0277474 A1* | 12/2005 | Barry | 463/42 |
| 2006/0167747 A1* | 7/2006 | Goodman et al. | 705/14 |
| 2006/0235790 A1* | 10/2006 | Jung et al. | 705/39 |
| 2007/0150537 A1* | 6/2007 | Graham | 709/203 |
| 2007/0196809 A1* | 8/2007 | Sen | 434/365 |
| 2008/0172293 A1* | 7/2008 | Raskin et al. | 705/14 |
| 2009/0170608 A1* | 7/2009 | Herrmann et al. | 463/42 |
| 2009/0199107 A1* | 8/2009 | Lewis et al. | 715/745 |

OTHER PUBLICATIONS

Xbox.com, "Calendar of Events—Rock Your Weekend Play & Win Prize Draw Official Rules", [online]. Microsoft Corporation, [Retrieved on Mar. 31, 2008]. Retrieved from the Internet: <URL: http://www.xbox.com/en-US/games/r/rockband/rockyourweekend/pwrules.htm>, 5 pp.

* cited by examiner

Player Information
100

Player ID
102

Player Address
104

Day and Time of Play
106

Personal Information
108

FIG. 1

PROVIDING OFFERS TO COMPUTER GAME PLAYERS

BACKGROUND

The present disclosure relates to using game play and offers made to the game players.

Computer games and other types of simulations (hereinafter referred to as "games") recreate fantasy worlds or environments and virtual versions of real world environments (e.g., baseball diamonds, race tracks, and golf courses) through three dimensional (3D) computer generated graphics. Players interact with these worlds solely or in groups in order to achieve goals such as, for example, the accrual of points, the accrual of virtual money or property, killing "bad" guys, virtual trophies or even a real world prize that is provided to a player who achieves the most points or achieves a predetermined goal.

SUMMARY

In one aspect, a method of rewarding a game player is described. The method includes determining a usage profile based on interaction between the player and items or goals in a game, identifying player information based on player statistics, categorizing the player, wherein the categorizing uses the usage profile and the player information to select a category for the player, selecting an offer from a group of offers, wherein the offer is for a real world object, service or event and the selecting step includes selecting from a group of offers available for players in the category and providing the offer to the player. Other embodiments of this aspect include corresponding systems, apparatus, and computer program products.

In another aspect, a method of determining game player information is described. The method includes receiving demographic information about the player, receiving game play information reflecting interactions between the player and an item or a goal in a game, compiling the demographic information and game play information to create a profile and providing the profile to a third party for the third party to determine an offer for a real world object, service or event to provide to players matching the profile, wherein the different offers are provided to different players according to the demographic information in the profile. Other embodiments of this aspect include corresponding systems, apparatus, and computer program products.

Implementations can include one or more of the following features. Determining a usage profile can include determining that the player has selected a type of equipment for use in the game, a brand of equipment for use in the game, or a goal to achieve in the game, has selected to use an item within the game with a particular frequency or for a particular length of time or has a particular number of items in a game bag. Identifying player information can include determining psychographic data of the player, demographic data of the player or behavioral variables about the player. The group of offers can include discounts on real world objects or opportunities. Providing the offer can include providing the offer to the player through one of electronic message or a postal service. The real world offer can be received from a third party and provided to the player.

These and other implementations can provide one or more of the following advantages. A player of a game is provided real world offers on items, services or events, such as dinners, parties, concerts, vacations or conventions can provide the player with greater enticement to play the game and achieve particular goals. This can keep a player playing the game longer. If there is any advertising or brand placement within the game, the advertising and brands can receive more of the player's attention time if the player continues to play the game. In turn, the offers for the items or events provide brands and distributors the opportunity to market to individuals who are more likely to be interested in their products. This can provide an efficient way of reaching out to interested consumers without spending time and capital on consumers who have little interest in a product or little ability to purchase the product. That is, marketers can target or customize their brands, services and products to an appropriate audience rather than making a generic offer to all players of a game. The offers for the real world items can be very simple to very complex. For example, the offer can be simply a discount on a real world item that the player also purchased in the game. A complex offer could be based on the individual's income, job, marital status or other demographic or psychographic data in combination with selections made by the player within the game. The techniques described herein can allow for better targeting of an offer to a player. That is, the offer is more likely to be relevant to the player, which can increase the likelihood the player will take advantage of the offer and follow through on a real world purchase. This correlation can be achieved by a greater number of impressions that the player receives of a particular advertisement, type of equipment, or brand.

BRIEF DESCRIPTION OF THE DRAWINGS

FIG. 1 illustrates an example of player information.

Like reference numbers and designations in the various drawings indicate like elements.

DETAILED DESCRIPTION

Figure 2:
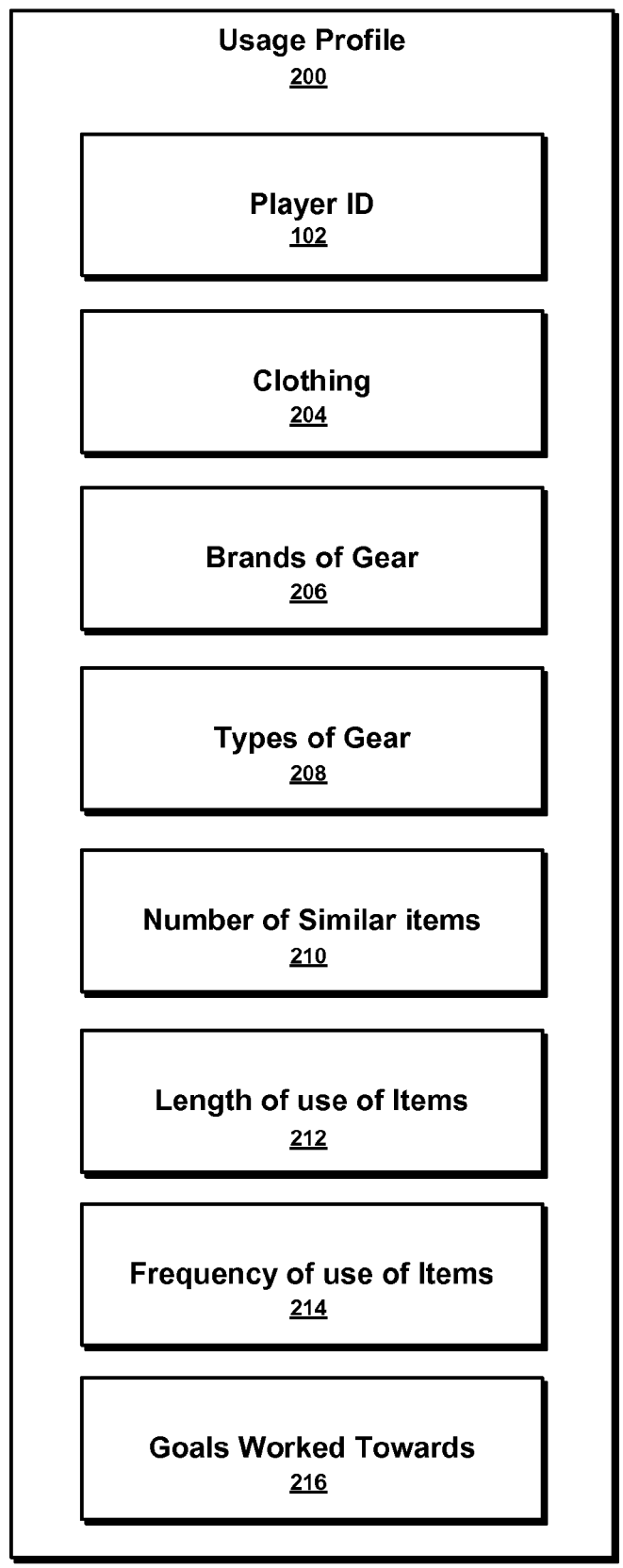
FIG. 2 illustrates an example of a usage profile.

A computer game allows one or more players to interact with representations of virtual environments, equipment, objects, characters, and associated state information. For instance, a virtual universe can include a virtual version of real world environments and objects, such as a virtual golf course, golf clubs and golf balls, or fabricated environments and objects. Players can interact with one or more pieces of virtual equipment in a virtual universe, such as a virtual weapon or a virtual golf club. The virtual universe can also include avatars and other virtual representations of a player including, but not limited to, a player's movements and gestures. In some implementations, a player can make purchase of real world items or services, or virtual items or services. Examples of virtual items that can be purchased include, but are not limited to, equipment, clothing (e.g., to appear on an avatar), accessories, property, and powers or capabilities for a character or a player's avatar. A player's purchases, whether of virtual or real world goods/services, and behavior during game play can be tracked. Offers for products and services can be identified and presented to the player that are relevant to, for example, a player's perceived personality and affinity for different items or environments. In some implementations, the offers can be based in part on information gathered about the player.

FIG. 1 illustrates an example of player information 100. A game system, such as a virtual golf game system, can access information about players. Some of the player information 100 can, for example, be gathered (e.g., entered by a player) when the player creates an account with the game system. Some of the player information 100 can be gathered as the player uses the game system. In some implementations, the player can update the player information 100, for example by using an edit account interface that allows updates to a player profile. In further implementations, some or all of the player information 100 can be collected automatically by searching various sources of information based on known information about the player such as the Internet Protocol (IP) address of the player's computer or game console, the geographical location of the player (e.g., derived from an IP address), online social or entertainment networks the player belongs to (e.g., Facebook, Friendster, and MySpace), and other suitable sources of information.

The player information 100 can include a player identifier (ID) 102, a player location or address 104, days and times of game play 106, and personal information 108, for example. Other types of player information are also possible. The player ID 102 identifies a player in the game system. Information related to the player can be stored in the game system using the player ID 102 as a key, for example. By way of illustration, the player ID 102 can include a player-entered value (e.g., an identifier chosen and entered by the player, such as a text value), a system-generated value (e.g., an automatically generated identifier, which can be unique and which can be standardized in the game system) or combinations thereof. Other player IDs are also possible. In some implementations, the player ID 102 can be associated with a password.

The player address 104 can include one or more of street address, city, zip code, country, phone number, geocode, IP address, and email address, for example. Other address information is possible. The player address 104 can be entered by the player, such as when the player creates an account. The player address 104 can indicate probabilities of characteristics associated with the player. For example, a player's address can be looked up in a demographic repository that includes various demographic statistics associated with geographic locations. For example, the repository can include distributions of annual income, education level and profession grouped by zip code. Using the demographic repository, the game system can determine, for example, a likely annual income, education level, or profession for the player, based, for example, on the player's zip code or phone number. The demographic repository can be maintained by the game system, or the game system can interface with a third party service provider system to access the demographic repository.

The game system can store the current day and time of each instance that the player plays a game in the day and time of play information 106. For example, a game system can store a start and a stop time each time the player plays a game. In general, the day and time of play can be indicative of a player's profession. Players of particular professions may only be able to play during certain times of the day. For example, players working in certain professions (e.g., "blue-collar" professions) may not be able to play at all during regular first-shift working hours, whereas players working in other professions or players who are self-employed can have the flexibility to play during lunch hours or at various other times throughout the day. A player's flexibility of day and time of play can indicate a player's ability to accept (and therefore have potential interest in) certain offers, such as vacation offers, which require a profession with flexible work arrangements.

The personal information 108 can include marital status, employer, profession, number and age of children, salary, political party, race, gender, sexual orientation, television viewing habits, web browsing habits, and other information of a personal nature. Other player information can include the identification of players or other individuals that a given player considers to be friends, such as through social networking, where the player shops, hobbies or interests, education level, electronic devices the player owns, vehicles the player owns and whether the player owns or rents a home. A player's friends can also be teammates or other players that participate in multi-player games with the player.

The player can enter some or all of the personal information 108. Additionally or alternatively, some or all of the personal information 108 can be indicators, which are determined based on the player's address. The system can also use information from other data in the player information 100 to gather data about the player, such as from publicly available databases. The gathered data can be used to populate the personal information 108. For example, a player's address can determine an income likelihood, as discussed above. In some implementations, the personal information 108 can be used to tailor offers made to the player. For example, offers can be presented to players having a salary equal to or greater than a minimum salary. Certain offers can also be presented to married players, players with children, players in a certain geographic location, etc.

In some implementations, a team or a group of players that play the game together can be provided an offer. The offer can be based on characteristics of the group, such as group demographics or group game goals. Information about each of the individuals on the team can be compiled to result in team information, which is then used to determine an offer to be made to the team. For example, the team information can be used in place of the player information 100.

FIG. 2 illustrates a usage profile 200. Information in the usage profile 200 can be determined based on interaction between the player and items or goals in a game. In general, information in the usage profile 200 can indicate psychographic traits of a player, such as attitudes, personality and lifestyle. More particularly, information in the usage profile 200 can indicate a player's affinity for certain brands and/or types of equipment. Information in the usage profile 200 can be used to tailor offers made to the player.

The usage profile 200 can include the player ID 102, clothing choices 204, brands of gear 206, types of gear 208, number of similar items 210, length of use of items 212, frequency of use of items 214, and goals worked towards 216. One or more of the items 204-212 is optional. The player ID 102 is an identifier of a player, and can be the same identifier used to store the player information 100 (FIG. 1).

A player can choose clothing and accessories that can appear on an avatar representing the player, and the player's selections can be stored in the clothing 204 choices. For example, in a virtual golf game, a player might choose a golf shirt and pants, shoes, gloves, and a hat or visor. As another example, in a virtual fishing game, a player might choose a shirt, hat, sunglasses, shoes or boots, and pants or shorts.

A player can select clothing from various styles and brands. Clothing used in the game can correspond to real-world brands. Contracts can be made with real-world companies to allow companies, e.g., at a defined cost, to include their clothing items in a game. A player can be able to select clothing items for free or a player can virtually buy clothing items using virtual money earned during game play. If a player virtually buys clothing, purchasing patterns can be determined, such as a player's tendency to spend more or less on clothing, as compared to other purchases the player can make (e.g., gear). As another example, a player's tendency to purchase more or less expensive clothing can be determined, based on the clothing items a player purchases. Identified clothing purchasing patterns can be used to tailor offers made to the player. For example, if a player has an affinity for a certain brand of clothing while playing a game, an offer for a real-world clothing item from the same manufacturer can be presented to the player.

A player can select to use gear (i.e., equipment) during game play. For example, in a virtual golf game, a player can select one or more styles and brands of golf clubs to use, a style and brand of golf bag, and a golf cart. As another example, in a virtual fishing game, a player can select a style and brand of one or more rods and reels to use, a style and brand of one or more fishing lures, a style and brand of a tackle box, and a style and brand of fishing boat and motor. A player's gear brand choices can be stored in the brands of gear information 206. In addition, the player's proficiency at using the gear can be determined and stored for later offer determination.

A player can be able to select gear to use for free or a player can have to (for some or all items) virtually buy gear before using the gear. Contracts can be made with real-world companies to allow companies include their gear items in a game. If a player virtually buys gear, purchasing patterns can be determined, such as a player's tendency to spend more or less on gear, as compared to other purchases the player can make (e.g., clothing). As another example, a player's tendency to purchase more or less expensive brands of gear can be determined based on the gear items a player purchases. Identified gear purchasing patterns can be used to tailor offers made to the player. For example, if a player has an affinity for a certain brand of gear while playing a game, an offer for a real-world item from the same manufacturer can be presented to the player.

In addition to choosing among different brands of gear, a player can choose different types of gear. For example, in a virtual golf game, a player can choose different types of golf clubs, such as fairway wood and driver clubs. As another example, in a virtual fishing game, a player can choose different types of reels, such as a fly reel or a spinning reel. A player's gear type choices can be stored in the types of gear 208.

A player's choice of type of gear can indicate a player's personality. For example, use of some gear (e.g., use of a fairway wood club in a virtual golf game) can indicate a more conservative personality than the use of other, more challenging gear (e.g., a driver). That is, some types of gear have more or less risk/reward tradeoffs than other types of gear. As another example, some types of gear (e.g., some types of golf clubs or fishing rods) can be more expensive than other types of gear.

A player's affinity for brands, types of clothing or gear can be determined by storing the number of similar items a player uses or purchases in the number of similar items 210. All purchases, including clothing and gear, can be grouped, such as by brand. For example, in a virtual golf game, a golf club manufacturer can also produce a golf clothing line, and the player's overall affinity for a brand can be determined by looking at both gear and clothing purchases. A player's affinity for a particular type of gear can be determined by examining the number of items of that type that the player uses or purchases. For example, in a virtual golf game, the purchase of a large number of putters can indicate a player's affinity for that type of golf club. As another example, in a virtual fishing game, the purchase of a large number of fly reels can indicate a player's affinity for fly reels. A player's affinity for a particular type of gear can result in offers for that particular type of gear (e.g., putters, fly reels) being presented to the player.

In addition to the purchase choices a player makes, a player's use of items can indicate player traits, such as their affinity for certain brands or types of gear. For example, in a virtual golf game, although a player can have purchased several types and brands of golf clubs, the player can choose to use a particular type or brand of club more often than other types or brands. As another example, in a virtual fishing game, although a player can have purchased many types and brands of lures and can have many lures in a virtual tackle box, the player can choose to use a particular type or brand of lure more often than other types or brands of lures. The length of time a player uses each item can be stored in the length of use of items 212.

A player's choice of a particular type of item in certain situations can indicate aspects of the player's personality. For example, in a virtual golf game, a player can show a pattern of choosing to use iron clubs that would be considered aggressive choices over more conservative clubs. Offers, such as vacation packages, can be tailored to players based on how aggressive the player appears to be (e.g., a "thrill-seeking" vacation package can be offered to players who appear to have an aggressive personality). The avatar selected by the player can have a particular gender, outward appearance and/or sexual orientation. The avatar can also have other social properties, such as belonging to social groups or virtual clubs. Thus, the avatar properties can also be used to determine player preferences and interests.

A player can send messages to other players during game play, such as instant messages or electronic mail messages. The messages can be reviewed for keywords. The keywords can be used to trigger events. The events or keywords can be logged as part of the player information or even be stored in the usage profile.

A game can include goals that a player works towards. Information about player's goals can be stored in the goals worked towards information 214. The particular goals that a player chooses to work towards can indicate aspects of their personality. For example, in a virtual golf game, a player can choose to play various virtual golf courses and a player's pattern of virtual golf course selection can be observed. For example, if a player plays the same course repeatedly, this can indicate a different personality type and interest than a player who never plays the same course twice in a row. As another example, in a virtual fishing game, a player can choose to virtually fish different virtual locations which can correspond to real geographic locations. A player's selection of virtual golf courses or virtual fishing locations can indicate an affinity for particular real-world locations. For example, a player who shows an affinity for virtual golf courses representing real-world courses in Florida can be presented with real-world vacation or golf packages located in Florida.

A player's activity related to goal achievement can indicate personality traits of the player. For example, in a virtual golf game, the player can work towards goals associated with a virtual course, such as beating an established par score for the course. Some players can choose to repeatedly play the same course until they beat the par score, while other players can show a pattern of trying a variety of courses, regardless of whether they beat par scores. A player's indicated preference of variety can be used, for example, to tailor offers presented to the player, such as vacation offers. As another example, in a virtual golf game, a player's aggressiveness style can be determined based on the difficulty level of virtual golf courses selected.

Figure 3:
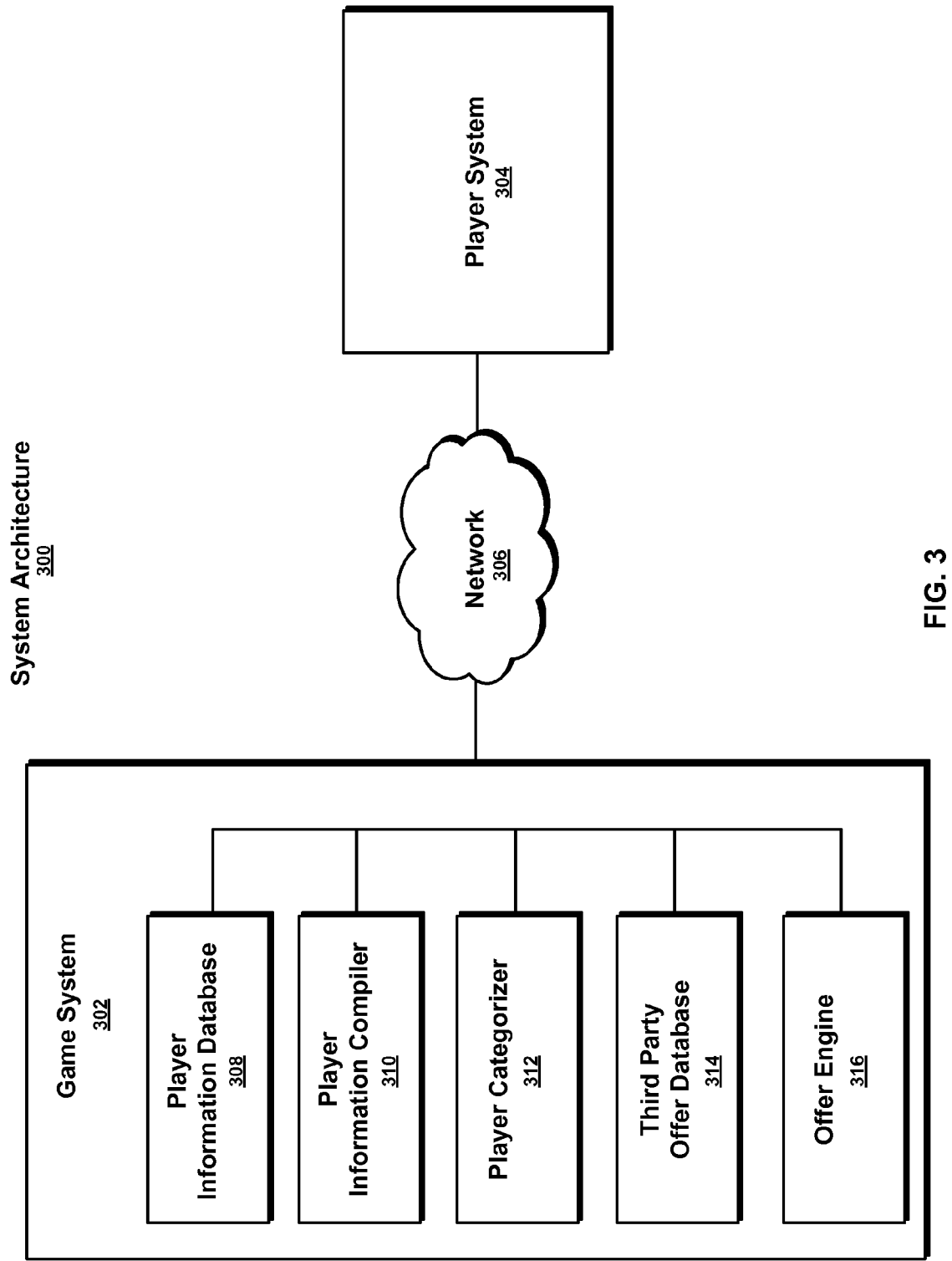
FIG. 3 is a schematic diagram of an example game system.

FIG. 3 illustrates an example of a system architecture 300. There may be fewer or more components than those illustrated in the system architecture 300. The system architecture 300 includes a game system 302 connected to a player system 304 across a network 306. The player interacts with a game (e.g., virtual golf game, virtual fishing game) on the player system 304. The game system 302 can be, for example, a single server or a group of multiple servers. The player system 304 can be implemented by a personal desktop computer, laptop computer, a game console, smart phone, cellular phone, personal digital assistant, or portable gaming device, to name a few examples. The network 306 can be a public or private, local or wide area network, such as the Internet. In some implementations, the system 302 and the player system 304 reside on the same computing device.

The game system 302 includes a player information database 308, a player information compiler 310, a player categorizer 312, a third party offer database 314, and an offer engine 316. The player information database 308 includes information about players using the player system 304. For example, the player information database 308 can include, for each player, the player information 100 (FIG. 1) and the usage profile 200 (FIG. 2).

The player information compiler 310 compiles information for a player, such as compiling the player information 100 and the usage profile 200. The player categorizer 312 can categorize players or their friends based on information in the player information database 308 or other information. For example, players can be categorized based on characteristics such as income, education level, profession, favorite brands used, favorite equipment used, and other game play characteristics.

The third party offer database 314 includes information about offers that can be presented to a player or the player's friends. The offer engine 316 can match offers in the third party offer database 314 to player categories identified by the player categorizer 312. For example, a luxury vacation offer can be matched to a category of players having an income at or above a threshold. The offer engine 316 can present an offer to one or more players included in a player category associated with the offer. For example, an offer can be presented through electronic or postal mail, and/or as an electronic message or advertisement presented on the player system 304 (e.g., during game play or while the player is accessing their game account). That is, an offer can be presented to the player in an electronic mail message that the player receives next time the player opens his or her e-mail account. Alternatively, the player can have a game account page, such as a profile page, where offers can be listed and kept until expiration. The game account page can be a page where the player can input or change his or her personal information, can provide information about the user's previous scores obtained when playing the game or can keep a list of friends with whom the player plays the game. Advertisements that are presented to the player, either in the game during game play or on the player's game account page can be related to offers that are presented to the player. Alternatively, the advertisements can be to encourage the player to either purchase items in the game or achieve particular goals within the game. Those achieved goals or purchased items that are based on the advertisements can then be fed into the determination of making a real world offer to the player. Offers can be for clothing, vacation packages, equipment, services, lessons, coupons, free or discounted golf play times, free or discounted buckets of golf driving range balls, court time, internet offers, brick and mortar store offers, tours, or entrance tickets, to name a few examples.

In some embodiments, offers are created in a database by an administrator who also creates rule sets and set parameters to trigger the offer. The offers are simply reward parameters, e.g., a 10% off coupon at a store, or a free virtual item, a gift certificate, or other such offer. A rule of the rule set determines when the offer is made and to whom. The rules can be based on any data or action that is collected in player information database 308, player information compiler 310, or player categorizer 312. An exemplary rule can require a player who is over 30 years old, has played a course in Florida and spent over $50 dollars in the game in the last 30 days. This rule can trigger offer X, such as a reduced round of golf at a specific golf course. The administrator for the rule set can determine how the offer is delivered, such as by electronic mail, immediately within the game, as an instant message, by postal service, etc. The rule can also include the duration the offer is available and the priority of the offer in case there is a situation where multiple offers are available to the player. Offers can also be designated as unique (offered only once per person) or non-combinable (can not be offered with other offers).

As noted, an offer can be made to the player within the game or during game play. For example, if the player of a golf game plays a hole particularly poorly, that is, lands in a water hazard or scores more than one triple Bogey in a row, the player may immediately receive an offer to upgrade their virtual golf club with a virtual golf club they can purchase that has better performance and is in a suitable price range for the player based on demographic information. As another example, if a team of players score particularly well on a hole, such as when a team in a scramble game of golf scores lower than another team for three holes in a row, the team members may be offered a buy one, get one free meal or drink offer at a local sports bar.

Figure 4:
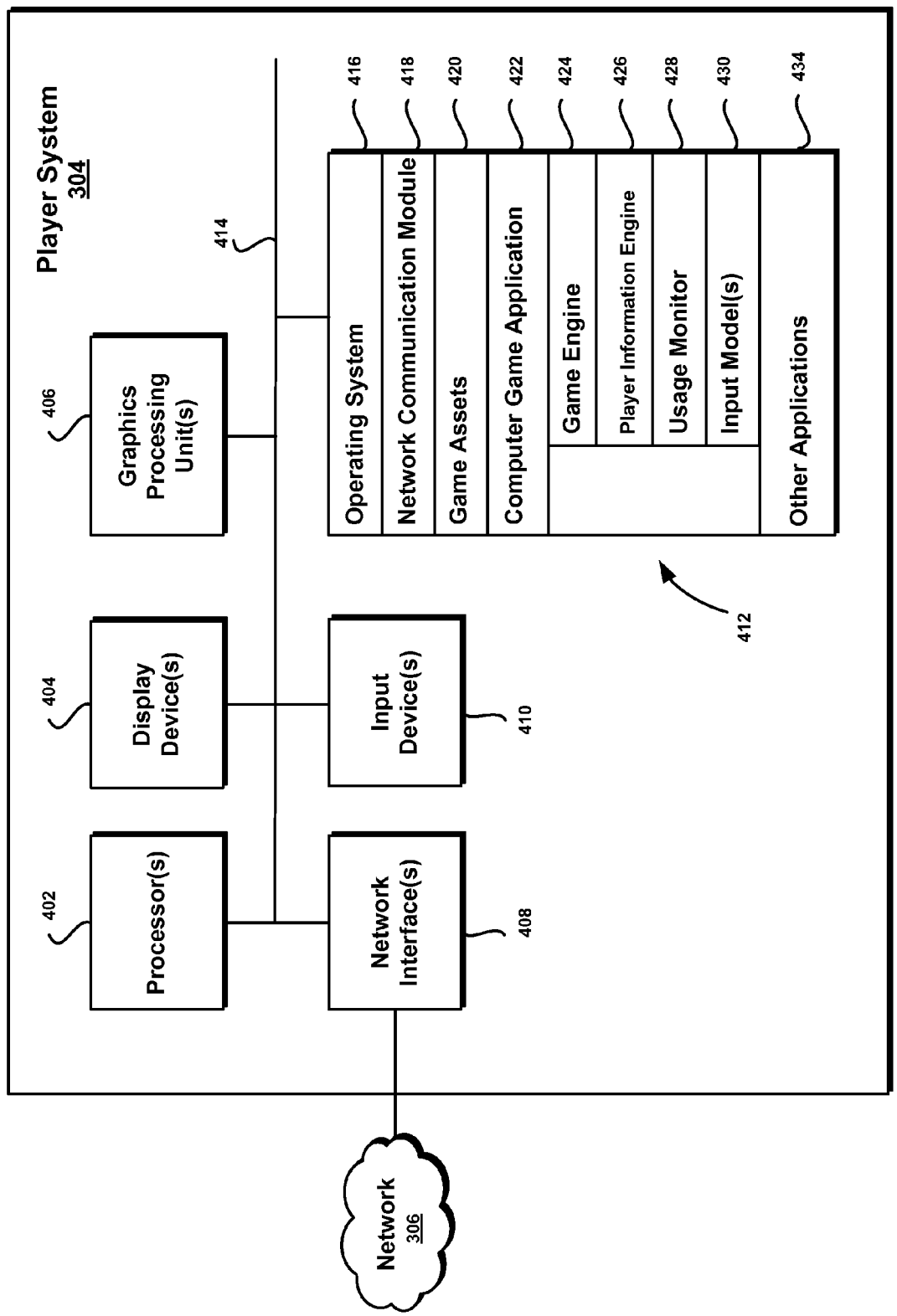
FIG. 4 is a schematic diagram of an example player system.

FIG. 4 illustrates an example of the player system 304. The player system 304 includes one or more processors 402 (e.g., IBM PowerPC®, Intel Pentium® 4, etc.), one or more display devices 404 (e.g., CRT, LCD), one or more graphics processing units 406 (e.g., NVIDIA® Quadro FX 4500, GeForce® 7800 GT, etc.), one or more network interfaces 408 (e.g., Ethernet, FireWire, USB, etc.), one or more input devices 410 (e.g., keyboard, mouse, game controller, camera, microphone, etc.), and one or more computer-readable mediums 412 (e.g. SDRAM, optical disks, hard disks, flash memory, L1 or L2 cache, etc.). These components can exchange communications and data via one or more buses 414 (e.g., EISA, PCI, PCI Express, etc.).

The term "computer-readable medium" refers to any medium that participates in providing instructions to a processor 402 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves. The computer-readable medium 412 further includes an operating system 416 (e.g., Mac OS®, Windows®, Linux, etc.), a network communication module 418, computer game assets 420, and a computer game application 422.

The network communication module 418 can provide processing that allows the player system 304 to communicate with other systems (e.g., the game system 302) across the network 306, using the network interface(s) 408. The computer game application 422 further includes a game engine 424, a player information engine 426, a usage monitor 428 and one or more input models 430. The player information engine 426 can gather and store, for example, the player information 100 during game play or at other times. The usage monitor 428 can monitor a player's game play, and can, for example, store usage information in the usage profile 200. The input model 430 interprets user input to the game, such as user interaction with a game controller, user gestures and body movements, and other input, and provides such input to the game engine 424. In some implementations, the electronic game application 422 can be integrated with other applications 434 or be configured as a plug-in to other applications 434.

The operating system 416 can be multi-player, multiprocessing, multitasking, multithreading, real-time and the like. The operating system 416 performs basic tasks, including but not limited to: recognizing input from input devices 410; sending output to a display device 404; keeping track of files and directories on computer-readable media 412 (e.g., memory or a storage device); controlling peripheral devices (e.g., disk drives, printers, GPUs 406, etc.); and managing traffic on the one or more buses 414. The network communications module 418 includes various components for establishing and maintaining network connections (e.g., software for implementing communication protocols, such as TCP/IP, HTTP, Ethernet, etc.). The application 422, together with its components, implements the various tasks and functions, as described with respect to FIGS. 1-3 and FIGS. 5-6.

The player system 304 can be implemented in any electronic or computing device capable of hosting the application 402, or part of the application 402, including but not limited to: portable or desktop computers, workstations, main frame computers, personal digital assistants, portable game devices, mobile telephones, network servers, etc. All of these component can by physically remote to each other.

While FIGS. 3 and 4 depict an example configuration of systems 300 and 304, other configurations are possible including configurations where some or all of the system 300 components are part of the player system 304, and vice versa. By way of illustration, the computer game application 422 can largely be part of the system 302 and be replaced with a light weight version of itself, such as an Adobe Flash presentation that runs in a web browser on the player system 304 and communicates with the system 302 through the network 306.

Figure 5:
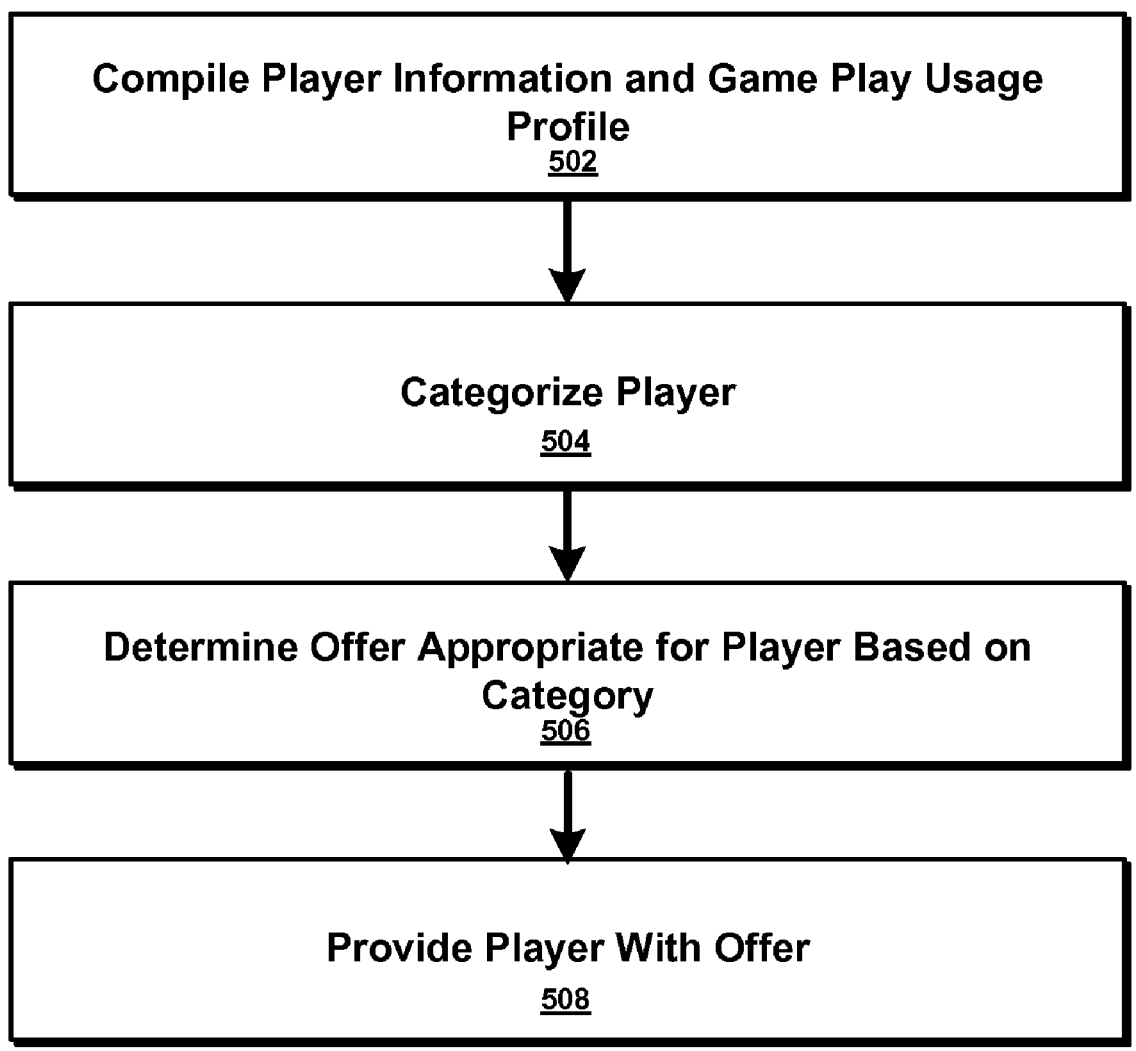
FIG. 5 illustrates an example of a game player reward determination process.

FIG. 5 illustrates one embodiment of a game player reward determination process 500. Player information and a game play usage profile are compiled for a player (step 502). For example, the player information compiler can, for a player, compile player information (e.g., personal information, demographics) and game usage information (e.g., types and brands of gear and clothing used, length and frequency of use of items, goals worked towards).

The player is categorized (step 504). For example, the player can be categorized by the player categorizer 312 (FIG. 3) into one or more categories. For example, categories can include players with flexible work schedules, players with luxury goods interest, players with an affinity for a particular brand, players with an interest in particular geographic locations, players with an interest in extreme sports or adventure, etc.

An offer appropriate for the player is determined, based on the category (step 506). For example, one or more offers can be determined, as appropriate for the player. Offers can be provided by third parties, such as clothing and gear manufacturers, retailers, travel agencies, or other service providers, to name a few examples. In some embodiments, rules are compiled in the database periodically, such as every few hours, and players matching the criteria are made an offer at the time that the rules are compiled. Some rules, such as ones that are triggered by a single in-game event, can be run in real time. An exemplary real time rule can be a rule that states that if a player purchases a specific branded virtual item, the player is provided an e-mail offer for a 10% discount on the same item in a real world, or brick and mortar, store.

The player is provided with the offer (step 508). The offer can be provided, for example, through electronic short message service (SMS), or regular postal mail, other suitable method of offer delivery or can be presented to the player while the player is using a game system. In-game communication systems can include instant messaging, the administrator posting a message on the player's home page or group chat where offers can be communicated.

Figure 6:
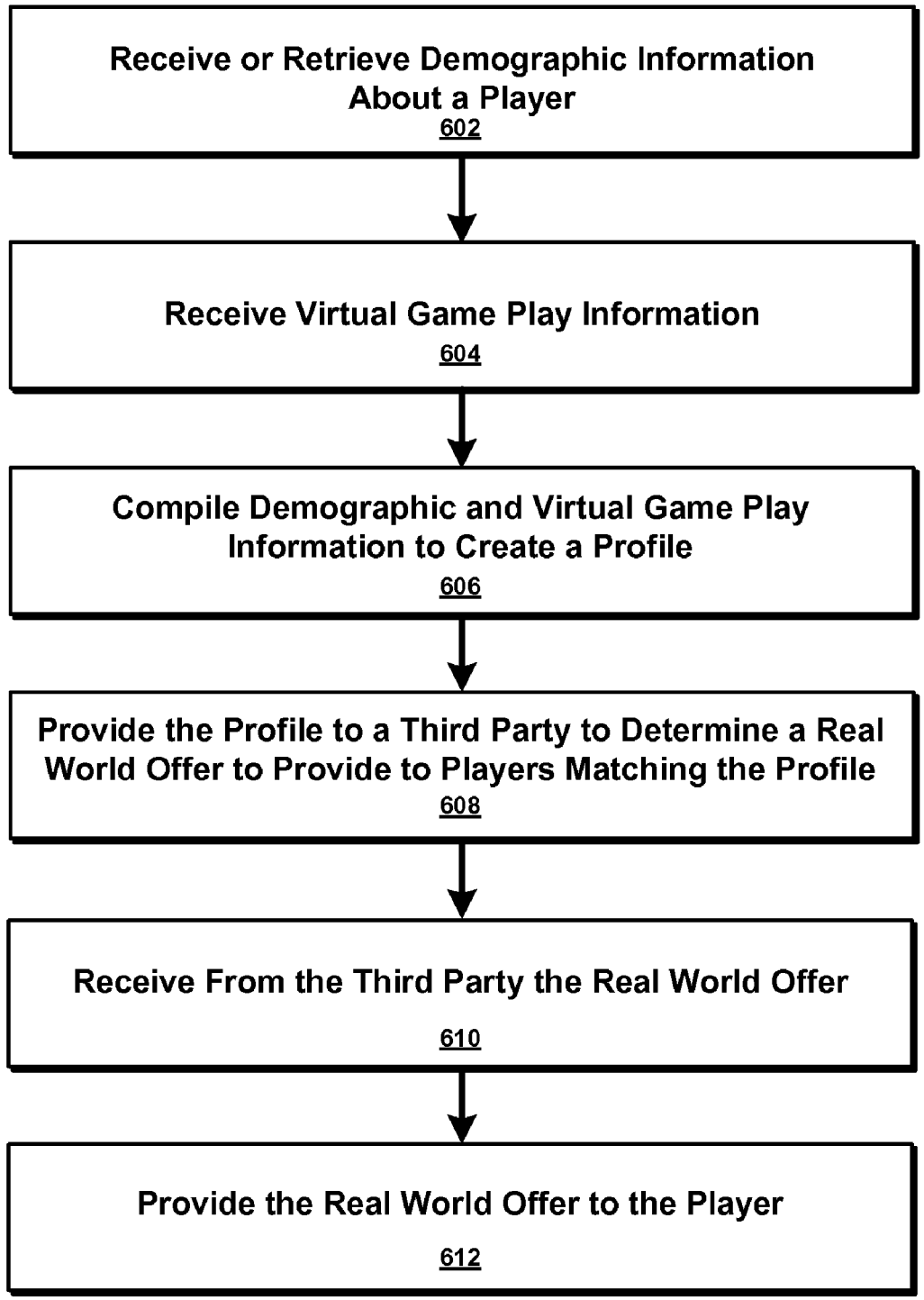
FIG. 6 illustrates an example of a process for presenting an offer to a game player.

FIG. 6 illustrates an alternative process for determining and presenting an offer to a game player. Demographic information about a player is received or retrieved (step 602). Game play information is received or retrieved (step 604). Demographic and game play information is compiled to create a profile (step 606).

The profile is provided to a third party to determine the real world offer. A real world offer is determined for players matching the profile (step 608). For example, the profile can be provided to a travel company, and the travel company can determine a travel offer based, for example, on a player's profession, income and game play usage.

The third party offer is received from the third party (step 610). For example, the offer can be received electronically from a third party system, or the offer can be received in a paper form.

The real world offer is provided to the player (step 612). For example, the real world offer can be sent to the player through electronic or postal mail, and/or the offer can be presented electronically to the player while the player is interacting with a game system.

Although virtual golf and virtual fishing games have been described, the ideas presented herein can be applied to any game or activity, including games and activities (e.g., virtual tennis, baseball, horse racing, skiing, car racing, etc.).

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, embodiments of the invention can be implemented on a computer having a display device, e.g., a CRT (cathode ray tube) or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can be any form of sensory feedback, e.g visual feedback, auditory feedback, or tactile feedback; and input from the player can be received in any form, including acoustic, speech, brain waves, other physiological input, eye movements, gestures, body movements, or tactile input.

Embodiments of the invention can be implemented in a computing system that includes a back-end component, e.g., as a data server, or that includes a middleware component, e.g., an application server, or that includes a front-end component, e.g., a client computer having a graphical player interface or a Web browser through which a player can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method of presenting offers to a game player by using a gaming device, the gaming device being operable to perform operations of the method comprising:
    determining, via the gaming device, psychographic traits of a player based on at least one of the player's product selection, difficulty level selection, and performance in a game, the psychographic traits providing information about at least one of the player's personality and preferences;
    identifying player information, wherein the player information includes at least one of player identifier, player location, player address, days and times of play, and personal information;
    selecting, via the gaming device, a category for the player using the player information and the psychographic traits of the player;
    selecting, via the gaming device, an offer from a group of offers available for the player in the category based on the player information and the psychographic traits of the player, wherein the offer is for a real world object, service or event; and
    providing, via the gaming device, the offer to the player in response to the player's product selection, difficulty level selection, or performance during the game before the player's next product selection or performance in the game, wherein the game is a virtual sports game.

2. The method of claim 1, wherein determining the psychographic traits includes determining a type of equipment the player selects for use in the game.

3. The method of claim 1, wherein determining the psychographic traits includes determining a brand of equipment the player selects for use in the game.

4. The method of claim 1, wherein determining the psychographic traits includes determining a goal that the player selects to achieve in the game.

5. The method of claim 1, wherein determining the psychographic traits includes determining that the player has selected to use an item within the game with a particular frequency or for a particular length of time.

6. The method of claim 1, wherein determining the psychographic traits includes determining that the player has a particular number of items in a game bag.

7. The method of claim 1, wherein identifying player information includes determining demographic data of the player.

8. The method of claim 1, wherein identifying player information includes determining behavioral variables about the player.

9. The method of claim 1, wherein the group of offers includes discounts on real world objects.

10. The method of claim 1, wherein the group of offers includes discounts on real world opportunities.

11. The method of claim 1, wherein providing the offer includes providing the offer to the player through one of electronic message or a postal service.

12. A non-transitory computer-readable medium having computer codes stored thereon to perform operations comprising:

determining psychographic traits of a player based on at least one of the player's product selection, difficulty level selection, and performance in a game, the psychographic traits providing information about at least one of the player's personality and preferences;

identifying player information, wherein the player information includes at least one of player identifier, player location, player address, days and times of play, and personal information;

selecting a category for the player using the player information and the psychographic traits of the player;

selecting an offer from a group of offers available for the player in the category based on the player information and the psychographic traits of the player, wherein the offer is for a real world object, service or event; and providing, via the gaming device, the offer to the player in response to the player's product selection, difficulty level selection, or performance during the game before the player's next product selection or performance in the game, wherein the game is a virtual sports game.

* * * * *